United States Patent [19]

Vogel

[11] 4,061,947
[45] Dec. 6, 1977

[54] SPEED CONTROL SYSTEM FOR CONTINUOUS STRIP MANUFACTURING APPARATUS

[75] Inventor: Ralph A. Vogel, Three Rivers, Mich.

[73] Assignee: Essex Group, Inc., Fort Wayne, Ind.

[21] Appl. No.: 711,754

[22] Filed: Aug. 4, 1976

[51] Int. Cl.² .......................... H02P 5/46; H02P 5/00
[52] U.S. Cl. ........................................ 318/77; 318/7
[58] Field of Search ................. 318/7, 51, 59, 66, 69, 318/77

[56] References Cited

U.S. PATENT DOCUMENTS

| | | | |
|---|---|---|---|
| 2,428,567 | 10/1947 | Harris et al. | 318/7 X |
| 2,441,985 | 5/1948 | Baker | 318/77 |
| 2,462,203 | 2/1949 | Kovalsky | 318/77 X |
| 2,965,821 | 12/1960 | King et al. | 318/7 |
| 3,515,959 | 6/1970 | Jackson | 318/7 |

*Primary Examiner*—B. Dobeck
*Attorney, Agent, or Firm*—Robert D. Sommer; Lawrence E. Freiburger

[57] ABSTRACT

A speed control system for use in a continuous strip manufacturing apparatus such as a continuous casting and rolling apparatus having a plurality of work means including roll stands through which metal rod or other elongate material is continuously moved. The control system includes a function generator providing a speed control signal to the speed regulator means of one roll stand which is linearly proportional to the speed of the preceding work means and which is also linearly proportional to the sum of an operator selected arbitrary signal voltage proportional to a desired speed ratio of the one roll stand to the preceding work means and a looper signal voltage proportional to the variation from a preselected position of the position of a loop of elongate material formed between the one roll stand and the preceding work means. The control system thus acts to maintain a desired proper relation between the speeds of the one roll stand and the preceding work means while providing compensating variations in the speed of the one roll stand with variations in the position of the loop of elongate material from a preselected position.

4 Claims, 2 Drawing Figures

SPEED CONTROL SYSTEM FOR CONTINUOUS STRIP MANUFACTURING APPARATUS

BACKGROUND OF THE INVENTION

This invention relates to continuous strip manufacturing apparatus such as continuous casting and rolling rod manufacturing apparatus, and more particularly to a control system for maintaining a desired relation between the speed of one roll stand and the speed of a preceding work means as well as maintaining a desired configuration in a loop of elongate material passing between the one roll stand and the preceding work means.

In a continuous casting and rolling apparatus, the strip or bar of metal formed in a casting wheel work means passes continuously through a plurality of roll stands or like work means driven by variable-speed motors at coordinated speeds selected to maintain a constant mass flow rate of metal strip through the roll stands. As the mass flow rate of metal strip through a roll stand is affected by various factors in addition to the roll speed of the roll stand, it is a common practice to employ a looper to sense the configuration of the loop of metal strip between the first roll stand and the casting wheel for providing a supplementary adjustment in the speed of the first roll stand. Another looper is similarly employed to sense the configuration of the loop of metal strip between the second roll stand and the first roll stand for providing a supplementary adjustment in the speed of the second roll stand. In the past, the speed of each of the first and second roll stands was controlled by supplying the speed regulator of the respective drive motor with a speed control signal simply comprising the sum of an operator selected arbitrary signal voltage proportional to the desired speed of the respective roll stand, a signal voltage proportional to the actual rotational speed of the preceding work means, and a looper signal voltage proportional to the deviation from a desired configuration of the loop of metal strip between the respective roll stand and the preceding work means. Because the operator selected arbitrary signal voltage was of the same order of magnitude as that of the speed signal voltage of the preceding work means, the speed control signal supplied to the speed regulator of either of the first and second roll stands did not vary linearly with changes in the speed of the preceding work means. Thus, a change in the speed of the casting wheel or of the first roll stand did not result in a directly proportional change in the speed of the respective subsequent roll stand.

SUMMARY OF THE INVENTION

The present invention overcomes the foregoing disadvantage of prior speed control systems for continuous strip manufacturing apparatus by employing a function generator providing a speed control signal to the speed regulator of a roll stand which is linearly proportional to the speed of the preceding work means and which is also linearly proportional to the sum of an operator selected arbitrary signal voltage proportional to the desired speed ratio of the roll stand to the preceding work means and a looper signal voltage proportional to the variation from a preselected position of the position of a loop of elongate material formed between the roll stand and the preceding work means. In a preferred embodiment of the invention, the function generator is a rotary dynamoelectric machine such as an alternator driven by the drive motor of the preceding work means and having field winding means and output winding means. A first signal voltage proportional to the desired speed ratio of the roll stand to the preceding work means provided by a manually operable control means and a second signal voltage corresponding to the variation in position of the loop of elongate material as sensed by a looper are added in a summing circuit to produce a third signal voltage for energizing the field winding means of the dynamoelectric machine. The output winding means of the dynamoelectric machine provide a fourth signal voltage proportional to the magnitude of the third signal voltage as adjusted by a factor substantially linearly proportional to the rotational speed of the preceding work means. The fourth signal voltage is applied by circuit means to the input of the speed regulator for the drive motor of the roll stand to cause the speed of the roll stand to vary substantially linearly with changes in the speed of the preceding work means while providing compensating variations in the speed of the roll stand with variations in the position of the loop of elongate material from a preselected position.

BRIEF DESCRIPTION OF THE DRAWINGS

The invention will be more readily understood from the following detailed description of a continuous casting and rolling apparatus controlled in accordance with this invention, taken in conjunction with the accompanying drawings wherein.

DETAILED DESCRIPTION

Figure 1:
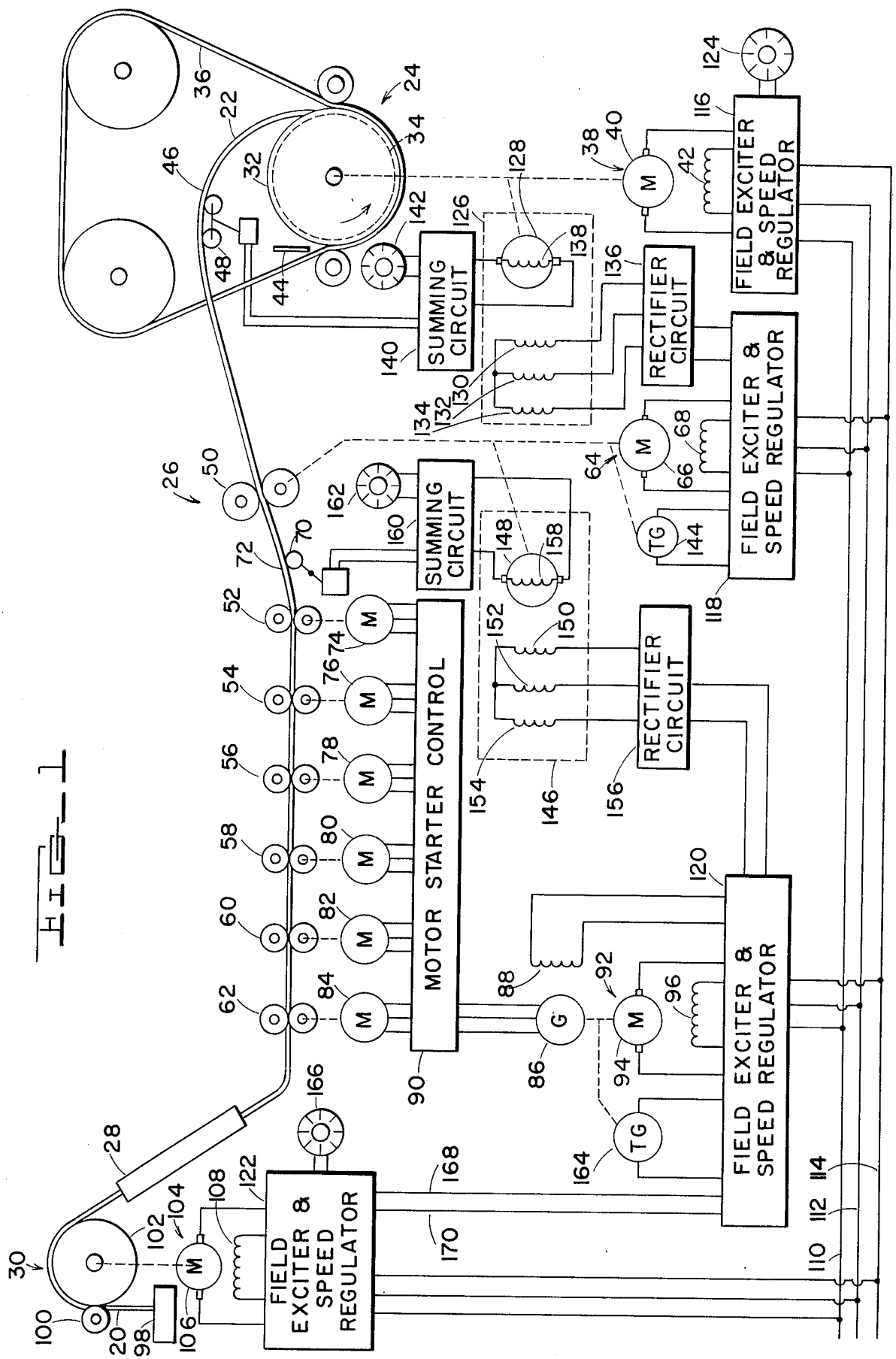
FIG. 1 is a diagrammatic representation of the continuous casting and rolling apparatus with the circuit arrangements of the speed control systems indicated generally.

Referring now to the drawings, the motor control system of the invention is illustrated in FIG. 1 in the environment of a rod manufacturing apparatus of the type in which metal rod 20 is rolled from a continuously cast bar 22. Such apparatus usually includes a continuous casting apparatus 24, a multiple stand rolling mill 26, cooling apparatus 28, and coiling apparatus 30.

The casting apparatus 24 is of conventional construction and includes a casting wheel 32 having a circumferential peripheral groove 34 therein. A continuous belt 36 cooperates with the groove 34 to define a casting chamber in the casting wheel. The casting wheel 32 is rotated about a horizontal axis by a variable-speed DC motor 38 having an armature 40 and a field 42. Hot molten metal, such as copper or aluminum, is poured from, for example, a spout 44 at a controlled rate into the casting chamber formed in the casting wheel 32. The molten metal is cooled within the casting wheel 32 to solidify and form the bar 22 which leaves the periphery of the casting wheel tangentially in an inclined direction. The bar 22 then forms a loop 46 in passing to the rolling mill 26. A looper or loop height sensing device 48 is provided for sensing the height of the loop 46. The looper 48 is biased against the loop 46 by a conventional pneumatic cylinder arrangement (not shown) as is well known in the looper art and is operative to provide an output signal proportional to the height of the loop 46.

The rolling mill 26 is of a conventional type having a plurality of roll stands 50, 52, 54, 56, 58, 60 and 62 to hot-form the cast bar 22 into the rod 20. The rolls of the first roll stand 50 are driven by a variable-speed DC motor 64 having an armature 66 and a field 68 to reduce the cross-sectional area of the bar 22. The bar 22, after the first reduction, passes between the reducing rolls of the second roll stand 52 for a second reduction in cross-sectional area and then proceeds progressively through the roll stands 54, 56, 58, 60 and 62. A looper or loop height sensing device 70 is provided between the roll stands 50 and 52 for sensing the depth of a catenary loop 72 which forms in the bar 22 between the roll stands 50 and 52. The looper is of a conventional type and is operative to provide an output signal proportional to the depth of the loop 72. The rolls of the roll stands 52, 54, 56, 58, 60 and 62 are driven respectively by three-phase synchronous motors 74, 76, 78, 80, 82 and 84 energized with variable-frequency alternating power supplied from a common AC generator or alternator 86 having a field 88. In accordance with well-known practice, a motor starter control 90 is provided to effect the energization of the motors 74, 76, 78, 80, 82 and 84 in timed sequence. The alternator 86 is driven by a variable-speed DC motor 92 having an armature 94 and a field 96.

After leaving the last roll stand 62, the rod 20 passes through cooling apparatus comprising a tubular chamber in which the rod is cooled by a suitable liquid coolant. The rod 20 emerging from the cooling apparatus 28 is formed into coils and deposited in a suitable container 98 by rod coiling apparatus 30 such as described in U.S. Pat. No. 3,811,610. The coiling apparatus 30 is shown in FIG. 1 as including an idler pinch wheel 100 in engagement with a capstan 102 that is driven by a variable-speed DC motor 104 having an armature 106 and a field 108.

Main line conductors 110, 112 and 114, which may be connected with a source of three-phase alternating current power, are shown as supplying current to four conventional field exciter and speed regulator units indicated symbolically by the boxes identified at 116, 118, 120 and 122. The regulator-exciters may be conventional motor controllers employing silicon controlled rectifier (SCR) or saturable reactor circuits to provide output voltages that are functions of various input control signals. Suitable regulator-exciters operative with input control signals derived from a manual speed setting control and one or more of a variety of sensors are available, for example, from Joliet Equipment Company of Joliet, Ill.

The armature 40 and field 42 of motor 38 are supplied with DC power by the exciter-regulator 116 for operation of the casting wheel 32 at a speed set by a manual control 124. It will be understood that the manual control 124 will be adjusted periodically as required to vary the speed of the casting wheel 32 upon slight changes in the rate of molten metal flow into the casting chamber so as to maintain a desired level of molten metal in the casting chamber. In accordance with well-known practice, exciter-regulator 116 provides IR compensation as a function of the IR drop in the armature circuit of the motor 38.

The armature 66 and field 68 of motor 64 are supplied with DC power by the exciter-regulator 118 for operation of the roll stand 50 at a speed determined in accordance with the present invention by the output voltage of a function generator 126. The function generator 126 is preferably a conventional automotive type three-phase alternator having its rotor 128 mechanically coupled to the motor 38. The three output windings 130, 132 and 134 of the function generator 126 are connected to a rectifier circuit 136 to supply a DC control voltage to the exciter-regulator 118. The field 138 of the function generator 126 is rotated with the rotor 128 and is connected to a summing circuit 140 which functions to add the signal outputs from the looper 48 and a manual control 142, as hereinafter described in detail. In accordance with well-known practice, a tachometer generator 144 mechanically coupled to the motor 64 supplies the exciter-regulator 118 with a feedback signal which is proportional to the speed of the motor 64.

The armature 94 and field 96 of motor 92 as well as the field 88 of alternator 86 are supplied with DC power by the exciter-regulator 120 for operation of the roll stands 52, 54, 56, 58, 60 and 62 at speeds determined in accordance with the present invention by the output voltage of a function generator 146. The function generator 146 is preferably a conventional automotive type three-phase alternator having its rotor 148 mechanically coupled to the motor 64. The three output windings 150, 152 and 154 are connected to a rectifier circuit 156 to supply a DC control voltage to the exciter-regulator 120. The field 158 of the function generator 146 is rotated with the rotor 148 and is connected to a summing circuit 160 which functions to add the signal outputs from the looper 70 and a manual control 162, as hereinafter described in detail. In accordance with well-known practice, a tachometer generator 164 mechanically coupled to the motor 92 supplies the exciter-regulator 120 with a feedback signal which is proportional to the speed of the motor 92.

The armature 106 and field 108 of motor 104 are supplied with DC power by exciter-regulator 122 to normally drive the capstan 102 with a substantially constant torque set by a manual control 166. In addition, a limit signal derived from the tachometer generator 164 is supplied by the exciter-regulator 120 to the exciter-regulator 122 through conductors 168 and 170 for preventing operation of the capstan 102 at excessive speeds when no rod 20 is passing through the coiling apparatus 30. The usual practice is to so limit the surface speed of the capstan 102 to a value approximately ten percent greater than the surface speed of the rolls of roll stand 62.

It will be understood that the exciter-regulators 116, 118, 120 and 122 include conventional circuitry for starting and accelerating the respective motors 40, 64, 92 and 104 to operating speeds. It will also be apparent that the manual controls 124, 142, 162 and 166 together with suitable motor current and speed indicators may be located on an operator's control console (not shown).

Figure 2:
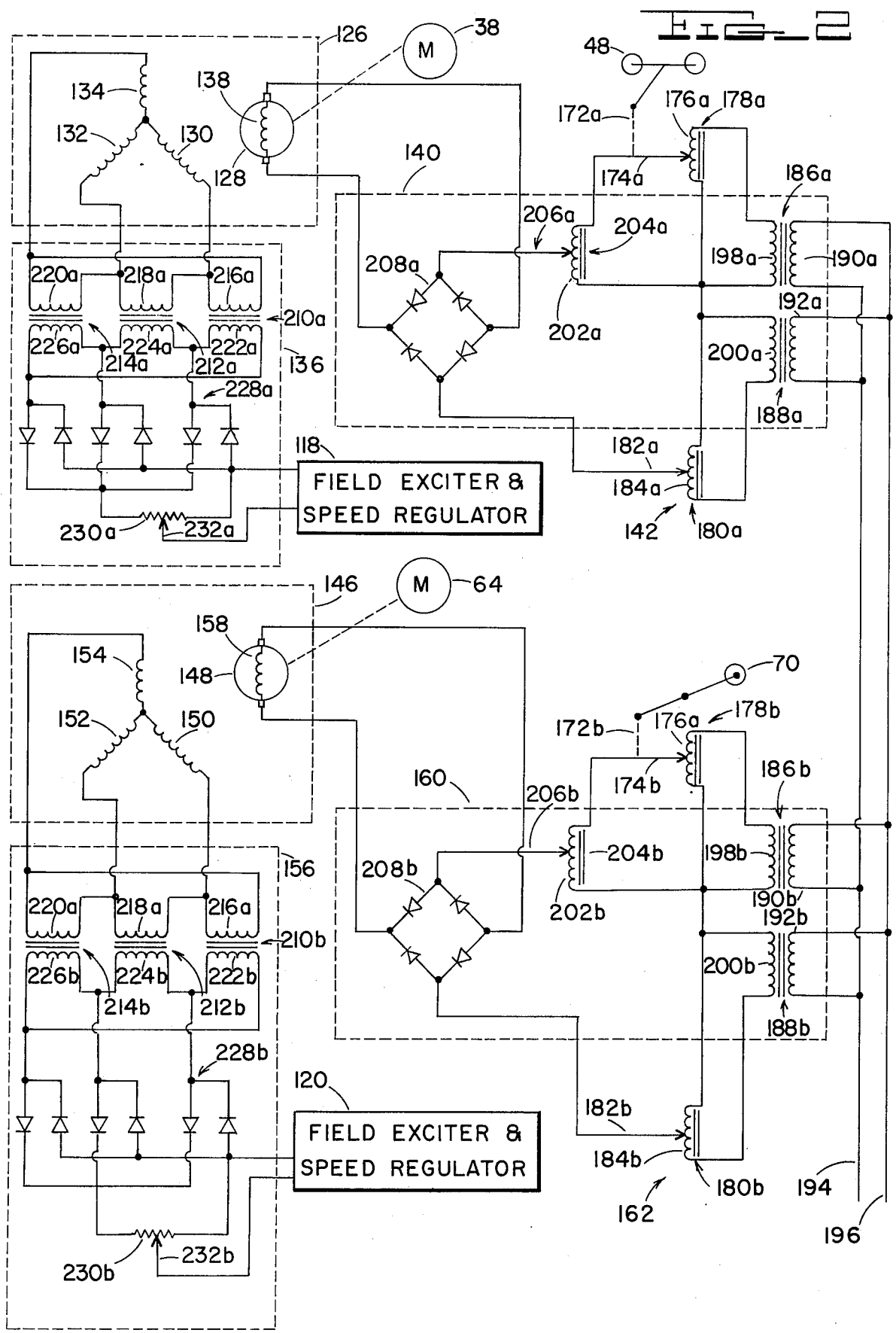
FIG. 2 is a schematic circuit diagram of two speed control systems utilized in the apparatus of FIG. 1.

Referring now to FIG. 2, there is illustrated the electrical features of the two speed control systems of the present invention wherein the reference numerals are the same used above with added ones as needed. Corresponding elements of the loopers 48 and 70, of the rectifier circuits 136 and 156, of the summing circuits 140 and 160, and of the manual controls 142 and 162 are identified by like reference numerals with the respective suffixes "a" and "b". The two speed control systems are generally alike and, thus, a description of the speed control system comprising looper 48, rectifier circuit 136, summing circuit 140 and manual control 142 will suffice.

The looper 48 is shown as comprising a movable lever 172a operatively connected to a contact slider 174a which makes sliding contact with the winding 176a of a variable transformer 178a. The manual control 142 is shown as comprising a variable transformer 180a having a manually movable tap 182a in sliding contact with a winding 184a. It will be appreciated that other known looper and manual control devices for producing variable electrical output voltages could be used.

The summing circuit 140 includes two step-down transformers 186a and 188a having their respective primary windings 190a and 192a energized from line conductors 194 and 196 which may be connected with a source of alternating current. The secondary winding 198a of transformer 186a is connected across the winding 176a of variable transformer 178a and the secondary winding 200a of transformer 188a is connected across the winding 184a of variable transformer 180a. The variable transformer 180 is adjusted to supply an output voltage proportional to the speed ratio of the motor 64 to the motor 38 necessary to maintain the loop 46 of the bar 22 in a desired configuration. The output terminals of the variable transformer 178a are connected to the winding 202a of a variable transformer 204a which has a manually movable tap 206a in sliding contact with the winding 202a. The variable transformer 204a serves as a proportional control to provide a selected portion of the output voltage of the variable transformer 178a. The variable transformer 204a is ordinarily adjusted to provide an output voltage of a magnitude approximately one-fourth that of the output voltage of the manual control transformer 180a when the loop 46 of the bar 22 is at a desired height and the manual control transformer 180a is at a desired setting. The transformers 180a and 204a are connected in series and have their respective taps 182a and 206a connected to the AC input terminals of a bridge rectifier 208a which in turn has its DC output terminals connected to the field 138 of the function generator 126. The output voltages of the transformers 180a and 204a are in additive relation and thus the field 138 is energized with a DC voltage that is proportional to the sum of the output voltages of the looper transformer 178a and the manual control transformer 180a.

The rectifier circuit 136 includes three isolation transformers 210a, 212a and 214a having their respective primary windings 216a, 218a and 220a connected to the output windings 130, 132 and 134 of the function generator 126. The secondary windings 222a, 224a and 226a of these transformers are connected to the AC input terminals of a three-phase, full-wave rectifier designated by the reference numeral 228a. The rectifier 228a comprises three pairs of series connected silicon dodes and has its DC output terminals connected across a voltage-dividing potentiometer 230a. The potentiometer 230a is provided with a manually movable tap 232a to apply a selected portion of the rectified output voltage of the rectifier 228a as a control voltage to the exciter-regulator 118.

The output windings 130, 132 and 134 of the alternator employed as function generator 126 have an output voltage which is substantially proportional to the product of the rotational speed of the rotor 128 and the energizing voltage applied to the field 138. Furthermore, the output voltage of the function generator 126 is substantially linearly proportional to the rotational speed of the rotor 128 and is substantially linearly proportional to the energizing voltage applied to the field 138. As noted above, the voltage applied to the field 138 by the summing circuit 140 includes a component proportional to the output voltage of the looper transformer 178a in additive relation with a component supplied by the manual control transformer 180a which is proportional to a desired speed ratio of the motor 64 to the motor 38. With the loop 46 of the bar 22 at a desired height and the manual control 142 at a particular setting, the output voltage of the function generator 126 is supplied by the rectifier circuit 136 to the exciter-regulator 118 as a speed control signal to thereby operate the motor 64 at a speed having a predetermined relation to the speed of the motor 38. As the magnitude of this speed control signal varies linearly with changes in the rotational speed of the motor 38, the speed of the rolls in the roll stand 50 will correspondingly vary linearly with the speed of the casting wheel 32.

At any operating speed of the rolls in roll stand 50, the mass flow rate of a copper bar 22 through the roll stand 50 depends in part on the temperature and oxygen content of the bar 22. In addition, changes in the surface condition of the rolls in the roll stand 50 and in the lubricity of the coolant applied to the bar 22 at the roll stand 50 may affect the mass flow rate of the bar 22 through the roll stand 50. Variations in the height of loop 46 of the bar 22 resulting from changes in the mass flow rate of the bar 22 through the roll stand 50 are sensed by the looper 48 to correspondingly vary the output voltage of the looper transformer 178a. Should the height of the loop 46 decrease below an initial preselected value, then the reduction in the output voltage of the looper transformer 178a supplied to the field 138 of the function generator 126 reduces the output voltage of the function generator 126, causing the exciter-regulator 118 to reduce the speed of the rolls in roll stand 50 thereby reestablishing mass flow equilibrium of the bar 22 between the casting wheel 32 and the roll stand 50. On the other hand, if the height of the loop 46 should rise above an initial preselected value then the increase in the output voltage of the looper transformer 178a supplied to the field 128 of the function generator 126 increases the output voltage of the function generator 126, causing the exciter-regulator 118 to increase the speed of the rolls in roll stand 50 thereby reestablishing mass flow equilibrium of the bar 22 between the casting wheel 32 and the roll stand 50. It will be apparent that the control system for the motor 64 will provide compensating variations in the speed of the rolls in the roll stand 50 with variations in the position of the loop 46 which are normally within acceptable limits. If an unusual change in operating conditions such as the casting of a hollow bar 22 results in a substantial departure of the loop 46 from a desired position, the manual control transformer 180a may be adjusted to effect a change in the speed of the motor 64 causing return of the loop 46 to the desired position.

The speeds of the roll stands 52, 54, 56, 58, 60 and 62 are regulated with respect to the speed of roll stand 50 in a similar fashion. The output voltage of the function generator 146 is substantially linearly proportional to the rotational speed of the rotor 148 and is substantially linearly proportional to the energizing voltage applied to the field 158. The voltage applied to the field 158 of the function generator 146 is proportional to the sum of the output voltages of the looper transformer 174b and the manual control transformer 180b. With the loop 72 of the bar 22 at a desired depth and the manual control 142 at a particular setting, the output voltage of the function generator 146 is supplied by the rectifier circuit 156 to the exciter-regulator 120 as a speed control signal for maintaining the speed of the motor 92 at a selected value causing the motors 74, 76, 78, 80, 82 and 84 to operate at corresponding selected speeds. As the magnitude of the speed control signal varies linearly with changes in the rotational speed of the motor 64, the speed of the rolls in the roll stands 52, 54, 56, 58, 60 and 62 will correspondingly vary linearly with the speed of the roll stand 50.

Although the tension of the bar 22 between each adjacent pair of the roll stands 52, 54, 56, 58, 60 and 62 remains substantially uniform under normal operating conditions, a number of factors affect the tension of the bar 22 in passing from the roll stand 50 to the roll stand 52. These factors include the relative speeds of the roll stands 50 and 52, the temperature and oxygen content of the bar 22, and the surface condition of the rolls in the roll stands 50 and 52. Variations in the depth of the loop 72 of the bar 22 resulting from changes in the tension of the bar 22 between the roll stands 50 and 52 are sensed by the looper 70 to correspondingly vary the output voltage of the looper transformer 178b. Should the depth of the loop 72 decrease from an initial preselected value, then the reduction in the output voltage of the looper transformer 178b supplied to the field 158 of the function generator 146 reduces the output voltage of the function generator 146, causing the exciter-regulator 120 to decrease the speed of the rolls in the roll stand 52 thereby reestablishing mass flow equilibrium of the bar 22 between the roll stands 50 and 52. On the other hand, if the depth of the loop 72 should increase from an initial preselected value then the increase in the output voltage of the looper transformer 178b supplied to the field 148 of the function generator 146 causing the exciter-regulator 120 to increase the speed of the rolls in roll stand 52 thereby reestablishing mass equilibrium of the bar 22 between the roll stands 50 and 52. In either event, the control system for the motor 92 is operative to provide compensating variations in the speed of the rolls in roll stand 52 with variations in the position of the loop 72 which are normally within acceptable limits. If an unusual change in operating conditions results in a substantial departure of the loop 72 from a desired position, the manual control transformer 180b may be adjusted to effect a change in the speed of the motor causing return of the loop 72 to the desired position.

Under normal operating conditions, the casting wheel 32 is driven by the motor 38 at a constant rotational speed set by the manual control 124 according to the rate of metal flow into the casting chamber and permitting substantially complete solidification of the metal leaving the casting wheel 32 in the form of a cast bar 22. The roll stand 50 is driven by the motor 64 at a speed relative to that of the casting wheel 32 so as to maintain the cast bar 22 in compression as it passes in an arcuate path from the casting wheel 32 to the roll stand 50. The speed of the motor 64 is set by the manual control 142 to maintain the height of the loop 46 at a desired value. If the height of the loop 46 changes, the resulting change in the output voltage of the looper transformer 178a causes a corresponding change in the output voltage of the function generator 126 supplied to the exciter-regulator 118 to correspondingly alter the speed of the motor 64 so as to maintain mass flow equilibrium of the bar 22 between the casting wheel 32 and the roll stand 50. Should it be necessary to change the rotational speed of the casting wheel 32 by changing the setting of the manual control 124, the resulting change in the speed at which the function generator 126 is driven by the motor 38 will result in the function generator 126 supplying a proportionally changed speed control voltage to the exciter-regulator 120 which correspondingly alters the speed of the motor 64.

The roll stand 52 is driven by the motor 72 at a speed relative to that of the roll stand 50 as set by the manual control 162 so as to maintain the depth of the loop 72 at a desired value as the bar 22 passes between the roll stands 50 and 52. If the depth of the loop 72 changes, the resulting change in the output voltage of the looper transformer 178b causes a corresponding change in the output voltage of the function generator 126 supplied to the exciter-regulator 120 to correspondingly alter the speed of the motor 92 and hence the speed of the motor 74 so as to maintain mass flow equilibrium of the bar 22 between the roll stands 50 and 52. Should the speed at which the roll stand 50 is driven by the motor 64 change, the resulting change in the speed at which the function generator 146 is driven will result in the function generator 146 supplying a proportionately changed speed control voltage to the exciter-regulator 120 which correspondingly alters the speed of the motor 74. It will be apparent that the speeds of the motors 76, 78, 80, 82 and 84 will be altered in proportion to any change in the speed of the motor 72 since all these motors are energized by the alternator 86.

While the invention has been described with reference to certain specific embodiments, it is to be understood that this description is made by way of example and not as a limitation to the scope of the invention.

What is claimed is:

1. In a continuous strip manufacturing apparatus having first and second spaced rotary work means between which elongate material passes in the form of a loop, a first electric motor for driving said first work means, a variable-speed second electric motor for driving said second work means, manually operable control means for producing a first signal voltage proportional to a desired speed ratio of said second work means to said first work means, looper means for sensing the position of said loop of elongate material and producing a second signal voltage corresponding to the variation in position of said loop of elongate material from a preselected position, and regulator means having input means and output means controlling the speed of said second motor to vary the speed of said second motor in direct proportion to changes in a control voltage applied to said input means; the improvement comprising: summing means for producing a third signal voltage directly proportional to the sum of said first and second signal voltages, function generator means for adjusting the magnitude of said third signal voltage by a factor substantially linearly proportional to the rotational speed of said first work means to provide a fourth signal voltage, and circuit means for applying said fourth signal voltage as a control voltage to said input means of said regulator means to cause the speed of said second motor to vary substantially linearly with changes in the speed of said first work means and to further cause compensating variations in the speed of said second motor to maintain the position of said loop of elongate material within acceptable limits.

2. Apparatus according to claim 1 wherein said function generator means comprises a rotary dynamoelectric machine driven by said first motor, said dynamoelectric machine including field winding means and output winding means for producing an output voltage which is substantially linearly proportional to the rotational speed of said first motor and which is also substantially linearly proportional to the energizing voltage applied to said field winding means, said field winding means being connected to said summing means for energization by said third signal voltage, and said output winding means being connected to said circuit means to supply the output voltage of said output windings as said fourth signal voltage.

3. Apparatus according to claim 2 wherein said first signal voltage is an alternating current voltage, said looper means includes a variable transformer for producing an alternating current output voltage which varies in accordance with the degree of variation in the position of said loop of elongate material from a preselected position, and said summing means includes a rectifier and means connecting said first signal voltage and at least a portion of the alternating current output voltage of said variable transformer in additive relation to said rectifier for producing said third signal voltage as a direct current voltage.

4. Apparatus according to claim 2 wherein said dynamoelectric machine is an alternator and said output winding means produces an alternating current output voltage, and said circuit means for applying said fourth signal voltage to said input means of said regulator means includes rectifier means connected to said output winding means to rectify the alternating current output voltage thereof.

* * * * *